Dec. 29, 1964    E. D. KEY    3,163,082
PIPE AND CONDUIT THREADING MACHINE
Filed March 7, 1962

United States Patent Office 3,163,082
Patented Dec. 29, 1964

3,163,082
PIPE AND CONDUIT THREADING MACHINE
Edward Denton Key, New Smyrna Beach, Fla., assignor, by mesne assignments, to Products, Inc., Daytona Beach, Fla., a corporation of Florida
Filed Mar. 7, 1962, Ser. No. 178,010
3 Claims. (Cl. 90—11.58)

This invention relates to improvements in pipe and electrical conduit threading machines and more particularly to improvements in threading machines for threading large pipe and conduit by a portable means.

A primary object of this invention is to provide an extremely versatile threading machine which quickly and simply adjusts to various sizes of pipe without the changing of die heads.

Another object of this invention is to provide a pipe threading machine that mills threads on pipe, thereby providing a smoother thread than would be obtained by other conventional methods.

Still another object of this invention is to provide a pipe threading machine which can be quickly and simply disassembled and reassembled for compact handling, thereby enhancing its portable characteristics and facilitating its storage when not in use.

An even further object of this invention is to provide a quick means for cutting a left hand thread on a piece of pipe or conduit without necessitating a complete entirely new threading unit.

Other objects and advantages of this invention will become apparent to those skilled in the art on reading the specification with reference to the accompanying drawings, in which.

Figure 1:
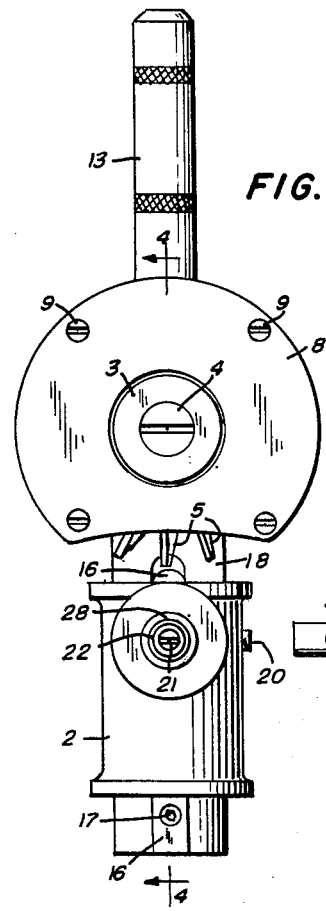
FIGURE 1 is a front view of the threading machine shown from the cutter end and illustrating the relationship of its component parts in this position.
Figure 2:
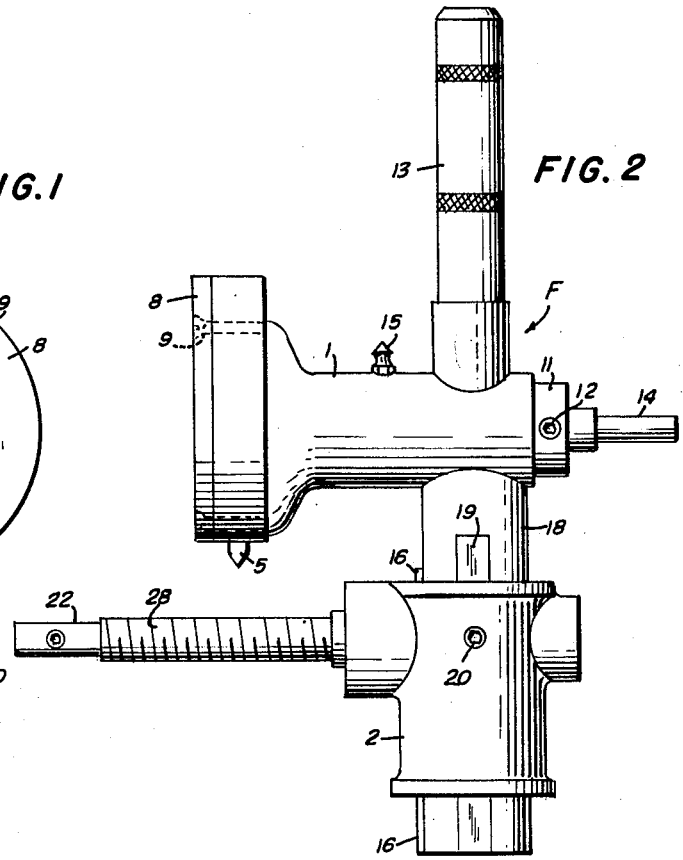
FIGURE 2 is a left side view of the threader showing the lead screw and cutter relationship.
Figures 3, 4:
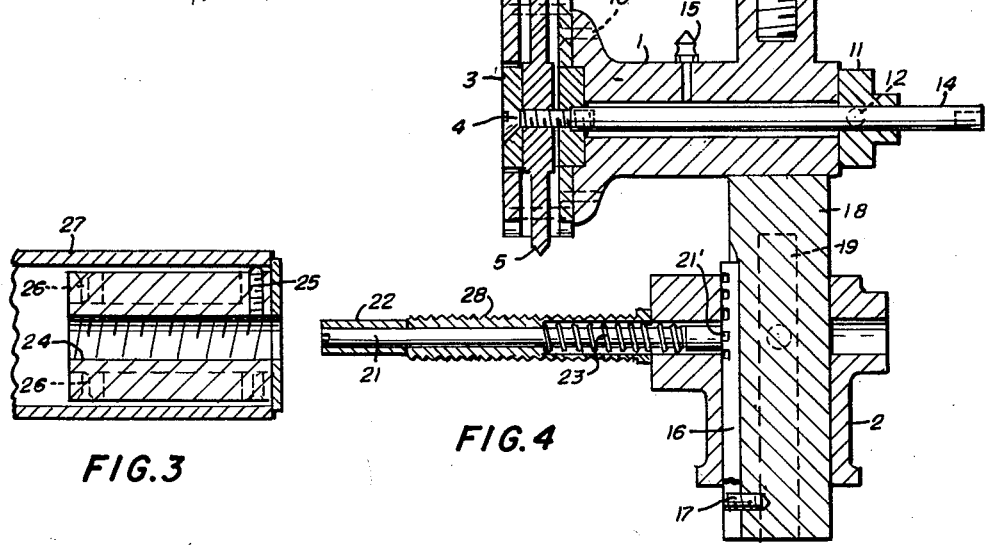
FIGURE 3 is a view of the mandrel which fits inside a piece of pipe to be threaded showing a cross section for clarity of illustration.
FIGURE 4 is a cross section along the line A—A of FIGURE 1.

Referring now in detail to the drawings, there is shown a threading unit frame F comprised generally of a bar head 1, extending from a supporting stand standard or extension bar 18. At the outer end of head 18 a cutter 5 protrudes slightly below a cover 8 which encases the cutter for safety reasons. The cover is of two parts and is held together by screws 9. A handle 13 which may be seen in FIGURES 1, 2 and 4 enables the user to apply slight pressure against this handle for feeding around pipe. An Allen flat head screw 4 presses against a washer 3, which in turn presses against the cutter 5, to thereby retain it to drive shaft 14. A collar 11 is secured on the shaft 14 at the rear end of the threading unit by an Allen set screw 12. The cover 8 is held to the threading unit by flat head screw 10. A sliding female member 2 is adjustable along the length of the bar 18. An Allen set screw 20 shown in FIGURE 2 screws into one side of the adjustable member 2, securing it at any established point by clamping on to a flat milled way 19 in the bar. In FIGURES 2 and 4, the numeral 22 indicates a knob attached to a shaft 21 by means of a pin or set screw. The shaft 21 passes through a threaded lead screw 28 that is enlarged at its inner end whereby a spring 23 biases the shaft toward a key 16. The key is formed with a plurality of slots in its upper end representing exact locations for sizes of pipe. The key 16 is held in position by an Allen cap screw 17. The shaft 21 whose end being enlarged as aforesaid has a protruding male key 21' extending across its end surface which when aligned with one of the slots will fit into position the shaft 21 at any one of the points which automatically points permits the threader to be adjusted with respect to the cutter 5. FIGURE 3 shows the cross section of a pipe mandrel M. The numeral 27 represents the pipe into which the mandrel is fitted. The mandrel has a shoulder around one end slightly larger than the I.D. size of the pipe whereby the mandrel is positioned at the end of the pipe. A separate mandrel is necessary for each size of pipe to be threaded. The O.D. size of said mandrel is held slightly under the I.D. size of pipe to be threaded. The numeral 26 represents set screws located at points around the mandrel. These set screws may be backed out slightly, each one to the same amount for the purpose of removing any play because of various tolerances in the I.D. sizes of pipe. An Allen set screw 25 is located at the accessible end of said mandrel. It secures the mandrel to the pipe 27 by tightening this set screw against the inside wall of said pipe.

The threading operation is begun by first adjusting the threading unit for the size pipe to be threaded, and screwing the lead screw 28 in FIGURES 2 and 4 into the mandrel of FIGURE 3 by screwing into the internal threads 24. The threader is screwed all the way into said mandrel until the cutter 5 of threading unit is within approximately ¼ of an inch from end of pipe 27. A ½" drill motor having a fairly high speed is then chucked to the end of the threading unit shaft 14 shown in FIGURES 2 and 4 which in turn is started by pressing the drill motor switch thereby turning the threading mill cutter 5. By pressing the fingers lightly against the handle 13 the threader frame is rotated around the periphery of said pipe thereby milling and accomplishing the threading process. After a complete and full thread of the desired length is cut on pipe, the drill motor is removed from threading unit by grasping the shaft 14 of threader where the drill motor chuck was attached. Threader may be quickly spun out of mandrel and away from pipe thus completing the threading operation. The set screw 25 of the mandrel shown in FIGURE 3 is then unscrewed from the inner wall of pipe 27 thereby permitting its removal from same.

It will be understood that the invention herein described is not limited to the exact details of construction and operation of the pipe threading machine as shown in the drawing and specification inasmuch as various modifications can be made by persons skilled in the art which are within the scope of the appended claims.

What is claimed is:
1. A machine for milling a thread on a pipe comprising an elongated tubular frame, a drive shaft having an intermediate portion rotatably supported by said frame and having a first end adapted for connection to a portable rotatable power source and a second cutting end, a rotatable cutter having a plurality of single powered blades supported on said cutting end having their peripheral cutting points defining a circle whose plane is normal to said drive shaft, a collar slidable along said tubular frame toward and away from said shaft, a guide screw supported by said collar parallel to said shaft, adjustable securing means affixing said collar to said frame such that said guide screw is spaced from said circle a distance slightly less than the outside radius of said pipe, a guide mandrel in one end of said pipe having a threaded aperture therethrough and having a central axis concentric with the axes of said guide screw and said pipe, the interior threads of said threaded aperture mating with the exterior threads of said guide screw, a handle for rotating said frame about the axis of said guide screw such that said guide screw is threaded into said mandrel.

2. The machine described in claim 1 wherein said mandrel includes an exterior flange about one end thereof bearing against the end of said pipe to accurately position said mandrel with respect to said pipe end and means to prevent said mandrel to rotate with respect to said pipe.

3. The machine described in claim 1 wherein said adjustable securing means comprises a longitudinal keyway along the exterior length of said tubular shaft and said keyway has a plurality of spaced notches therealong, said guide screw having a longitudinal bore therethrough, a lock shaft slidably received in said bore, a spring normally biasing said one end of said lock shaft toward said notches and knob means at the other end of said shaft for manually pulling said one end away from said notches to permit free slidable movement between said collar guide screw combination and said keyway.

References Cited by the Examiner

UNITED STATES PATENTS

| 764,341 | 7/04 | Bond. |
| 1,823,959 | 9/31 | Steinmayer. |

FOREIGN PATENTS

| 388,381 | 2/33 | Great Britain. |
| 414,633 | 1934 | Great Britain. |
| 821,862 | 10/59 | Great Britain. |
| 89,244 | 5/37 | Sweden. |
| 311,318 | 1/56 | Switzerland. |

WILLIAM W. DYER, Jr., *Primary Examiner.*